Dec. 10, 1940.    E. CLARK    2,224,141
NONSKID TIRE
Filed July 8, 1938
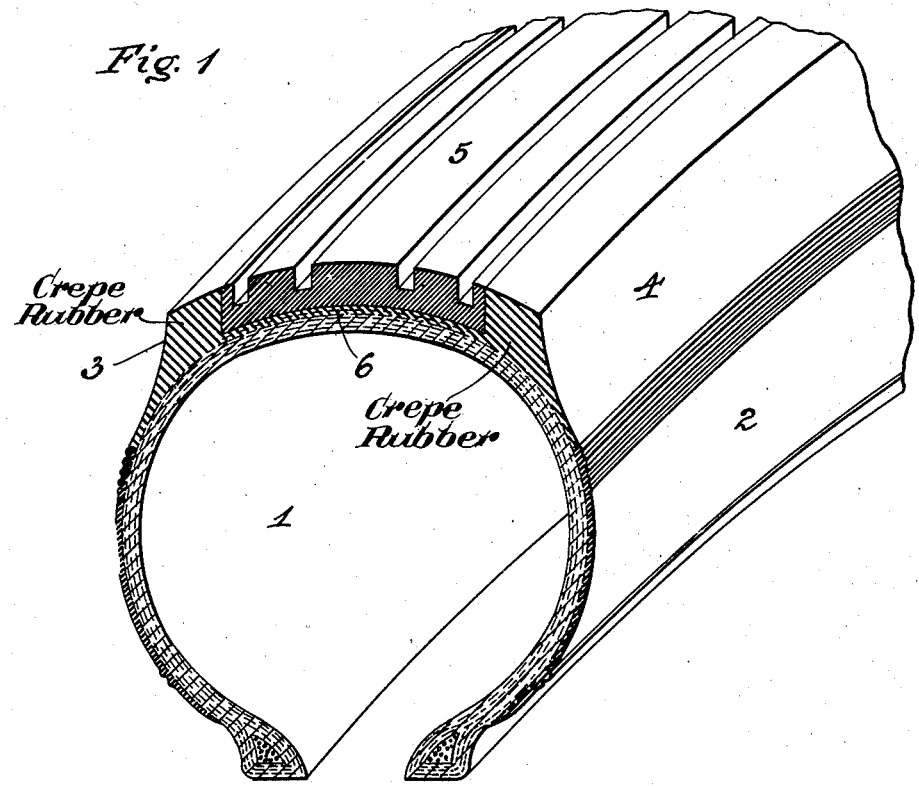
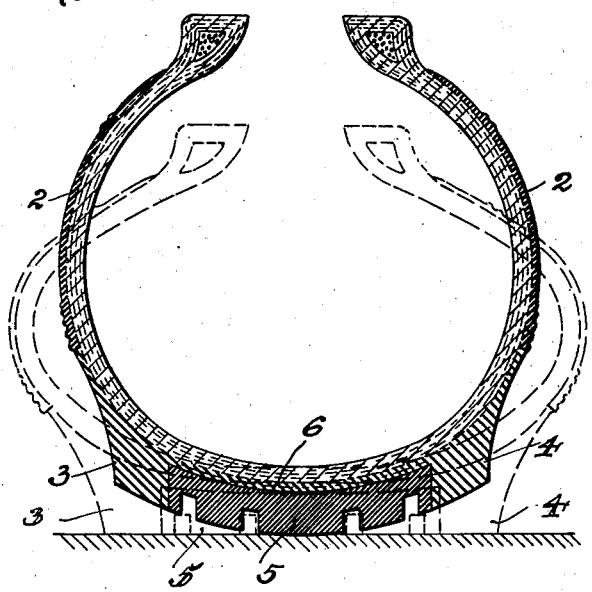
INVENTOR
Ernest Clark
BY
his ATTORNEYS

Patented Dec. 10, 1940

2,224,141

UNITED STATES PATENT OFFICE 2,224,141

NONSKID TIRE

Ernest Clark, East Orange, N. J.

Application July 8, 1938, Serial No. 218,075

3 Claims. (Cl. 152—209)

This invention relates to a nonskid tire and, more particularly, to the tread portion thereof; with the purpose of providing a tread portion that is extremely effective to prevent skidding or slipping while, at the same time, conforming in general to the usual shape and size of a tire tread, in order to avoid the necessity of employing special molds and the like for its manufacture.

Another object consists in providing such a tire, the tread of which comprises longitudinally disposed ribs or bands that are composed partly of heavily compounded vulcanized tread rubber and partly of substantially uncompounded, but vulcanized, crepe rubber.

Another object consists in providing such a tire in which the tread elements are so arranged that the driving contact and stress will ordinarily be carried by the heavily compounded rubber portion, while the crepe rubber portions will only come into substantial use when the tire is deformed under stresses such as arise from braking or turning.

A further object consists in providing certain improvements in the form, construction, material and arrangement of the several parts, whereby the above named and other objects may effectively be obtained.

A practical embodiment of the invention is represented in the accompanying drawing, in which Fig. 1 shows a perspective view of a pneumatic tire casing having a tread in accordance with my invention; and Fig. 2 shows a transverse section with the ordinary driving condition of the tire substantially represented in full lines; and the deformed condition, for instance under braking stress, substantially represented in broken lines.

In the drawing, the carcass of the tire is generally denoted by 1, and it may be of any usual fabric and bead wire construction, in accordance with customary practice; or of any special form which is suited to the application of a nonskid tread.

The rubber side walls of the tire are indicated by 2 and may be of any well known or suitable composition applied in any usual or satisfactory manner; all of which is well understood in the art.

My improved tread, as illustrated, consists of two circumferential bands 3, 4 that are composed of substantially uncompounded, but vulcanized, crepe rubber; together with an intermediate band 5 that is composed of heavily compounded vulcanized tread rubber.

It has been the practice for many years heavily to load or compound rubber used for tire treads in order to promote its durability and other generally desired characteristics. My invention is intended to comprehend any such suitable rubber compound for the band 5, since the specific or particular compound is not a matter of importance in my invention. The side bands 3 and 4 are composed of crepe rubber, which is a material that has long been known to the rubber tire industry. By crepe rubber, I mean rubber which has been coagulated, usually by an acid such as acetic acid, and then milled in order to impart the characteristic tough crepe body and appearance. In preparing these side bands 3 and 4, I prefer to associate vulcanizing substances therewith by dusting them on to the rubber and giving it a brief mixing treatment. Thereafter the crepe rubber is passed between the rolls of a calendar which are spaced to the desired extent, and one of which is cold. If the sheets thus formed are not of the desired thickness, they may be superimposed so as to attain the thickness called for. This material is then preferably left standing for a few hours so that the migratory nature of the vulcanizing substances may improve the distribution thereof in the rubber.

The bands 3, 4 and 5, may then be applied to the tread of the tire, either consecutively or simultaneously, after which the tire is subjected to the usual vulcanizing treatment in a mold which, of course, involves heat and heavy internal pressure. This vulcanizing step not only unites the tread, as a whole, with the fabric carcass of the tire, in a well understood manner, but it also causes a firm union of the bands 3, 4 and 5. Cross sections taken from tires thus manufactured show that the band 5 has a very firm, and generally irregular, line of union with the bands 3 and 4, although the said line of union is conventionally represented as straight in the drawing.

The vulcanizing substances employed in bands 3, 4 and 5, may vary in character and amount within the knowledge of those skilled in this industry, but they should be so adjusted that a suitable degree of vulcanizing will be attained by all three bands when subjected to the same conditions of time and temperature. It is quite customary at the present time to use comparatively small amounts of sulphur, zinc oxide, and accelerators; and I prefer, in the bands 3 and 4, to use, for instance, about one per cent. of sulphur and even a slightly less amount of suitable organic accelerators. As already indicated, these vulcanizing substances, with their individual and collective characteristics, as well as their suitability for vulcanizing under various conditions of time and temperature, are well known to those skilled in the tire manufacturing industry, so that I deem it unnecessary to give any further specific details since the skilled operator will readily be able to obtain the desired result of uniform vulcanization of the bands 3, 4 and 5, together with their proper adhesion to the tire carcass. It may, however, be mentioned that I have in actual practice found the following formula to be satisfactory for the bands 3 and 4: rubber 50 parts, sulphur 1.1, benzothiazylthiobenzoate 0.325, diphenylguanidinephthalate 0.225, cadmium yellow 0.25. In this formula the parts are by weight and benzothiazylthiobenzoate and diphenylguanidinephthalate are organic accelerators. Vulcanization for sixty-five minutes at forty-five pounds steam pressure is appropriate to the formula just named.

It will be observed that the bands 3 and 4 are connected by a strip or layer 6 that lies intermediate the band 5 and the fabric carcass 1. This serves more firmly to unite the band 5 with the bands 3 and 4 as a result of vulcanization, and it also acts as a cushioning element between the band 5 and the fabric carcass 1. If desired, the usual fabric breaker strip may be imbedded in this layer 6.

Instead of forming the bands 3, 4 and 5 as above described, the same may be formed by extrusion from a machine designed for that purpose, in accordance with a practice well known in this industry.

In the drawing I have shown the band 5 as provided with a usual type of nonskid formations, but this is merely a matter of choice and constitutes no part of my invention. The mold in which the tire is vulcanized may be engraved to impart any such desired configurations to any or all of the bands, or they may be left plain if a smooth tread tire should be desired.

The side bands 3 and 4, which are composed of the vulcanized crepe rubber, are very tough and enduring, but they are much more yielding and have a much greater nonskid function than the central band 5, which latter is so compounded as to provide an excellent driving surface while resisting wear and abrasion due to road friction. Such tread compounding is familiar in this industry.

The convex cross-sectional shape of the tread causes the tire, during ordinary use, to ride mainly upon the central band 5, as indicated by full lines in Fig. 2 of the drawing, thus providing a maximum of durability and a minimum of frictional resistance to travel. However, when the tire is subjected to an unusual stress or strain such, for instance, as arises from sudden application of the brakes, and which frequently tends to serious skidding of the vehicle, the tire will be deformed, somewhat as indicated in broken lines in Fig. 2. This deformation will bring the side bands 3 and 4 into firm contact with the road bed, and, because of their inherent characteristics, will prevent skidding, or restrain the same in its incipiency. From the foregoing it will be seen that my construction of tire tread provides all the advantages of the usual heavily compounded rubber tread in connection with the usual operation of the vehicle; and that it also makes immediately available effective nonskid capacity which is automatically and instantaneously brought into play under conditions which commonly bring about liability to skid. Even as the tire wears away in use, it will continue to function substantially in this way, because, although the side bands 3 and 4 are not as wear-resisting as the central band 5, they are, in use, less subject to road friction; so that throughout its period of useful life the tire tread retains substantially the convex cross-sectional form represented in the drawing, which leaves the central band 5 as the principal support or road contact during ordinary operation of the vehicle, while retaining the side bands available in case of emergency.

In this connection it may be noted that I do not primarily rely upon the nodulated or irregular surface that is characteristic of crepe rubber, as I have found that, when the said rubber is vulcanized without any substantial compounding, it has a pronounced nonskidding and nonslipping effect, even though its surface be smooth or provided merely with usual nonskid grooves or configurations. However, if desired, the part of the mold which comes in contact with the crepe rubber bands 3 and 4 may be engraved so as to impart to the said bands, during the temperature and pressure of vulcanization, a form substantially corresponding to the nodulated surface of ordinary crepe rubber.

The fact that compounding ingredients are omitted from the bands 3 and 4 lessens the weight of the tire and also produces an economy in cost of manufacture. I prefer to leave the crepe rubber in its natural yellowish color or, as indicated in the foregoing formula, to use a slight amount of yellow coloring matter, such as cadmium yellow. In either case, the bands of crepe rubber form a pleasing color contrast with the remainder of the tire tread.

It will be understood that various changes may be resorted to in the form, construction, arrangement, and materials, without departing from the spirit and scope of my invention; hence I do not intend to be limited to the details herein set forth, except as they may be included in the claims.

What I claim is:

1. A nonskid tire having a tread comprising a central portion of relatively hard and wear resisting rubber, and side portions of relatively soft nonskid rubber, the cross sectional profile of the tread being so convex that, during ordinary operation, the tire will ride upon the said central portion and the said side portions will come in substantial contact with the road surface only when the tire is distorted by unusual stress.

2. A nonskid tire having a tread comprising a central portion of relatively hard compounded vulcanized rubber, and side portions of relatively soft substantially uncompounded vulcanized crepe rubber, the cross sectional profile of the tread being so convex that, during ordinary operation, the tire will ride upon the said central portion of compounded vulcanized rubber and the said side portions of substantially uncompounded vulcanized crepe rubber will come in substantial contact with the road surface only when the tire is distorted by unusual stress.

3. A nonskid tire having a tread comprising, a central portion of relatively hard compounded vulcanized rubber, and side portions of relatively soft substantially uncompounded vulcanized crepe rubber, the central portion having a width greater than the combined width of the side portions, and the cross-sectional profile of the tire tread including all three portions being continuous and so convex that, during ordinary operation, the tire will ride upon the said central portion of compounded vulcanized rubber, and the said side portions of substantially uncompounded vulcanized crepe rubber will come in substantial contact with the road surface only when the tire is distorted by unusual stress, the outer edges of the said side portions being furthest from the road surface during ordinary operation.

ERNEST CLARK.